(12) United States Patent
Beckman

(10) Patent No.: US 10,752,359 B2
(45) Date of Patent: *Aug. 25, 2020

(54) TUNED LIGHTING

(71) Applicant: The Boeing Company, Chicago, IL (US)

(72) Inventor: John Christiaan Beckman, Everett, WA (US)

(73) Assignee: The Boeing Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/272,823

(22) Filed: Feb. 11, 2019

(65) Prior Publication Data

US 2019/0176988 A1    Jun. 13, 2019

Related U.S. Application Data

(63) Continuation of application No. 15/151,749, filed on May 11, 2016, now Pat. No. 10,202,194.

(51) Int. Cl.
| | | |
|---|---|---|
| *B64D 11/00* | (2006.01) | |
| *B60Q 3/43* | (2017.01) | |
| *B60Q 3/47* | (2017.01) | |
| *H05B 47/16* | (2020.01) | |

(52) U.S. Cl.
CPC ............ *B64D 11/00* (2013.01); *B60Q 3/43* (2017.02); *B60Q 3/47* (2017.02); *H05B 47/16* (2020.01); *B64D 11/003* (2013.01); *B64D 2011/0038* (2013.01); *B64D 2011/0076* (2013.01)

(58) Field of Classification Search
CPC .......... B60Q 3/43; B60Q 3/47; B64D 11/003; B64D 2011/0038; B64D 2011/0076
See application file for complete search history.

(56) References Cited

U.S. PATENT DOCUMENTS

| | | | |
|---|---|---|---|
| 9,493,112 B2 | 11/2016 | Thomas et al. | |
| 10,202,194 B2* | 2/2019 | Beckman ............... | B64D 11/00 |
| 2005/0185399 A1* | 8/2005 | Beermann ............. | B64D 11/00 |
| | | | 362/231 |
| 2005/0253533 A1 | 11/2005 | Lys et al. | |
| 2007/0109802 A1 | 5/2007 | Bryan et al. | |
| 2009/0224693 A1 | 9/2009 | Mukai et al. | |
| 2010/0001645 A1 | 1/2010 | Kraemer | |
| 2010/0072904 A1 | 3/2010 | Eckel et al. | |
| 2010/0190510 A1 | 7/2010 | Maranhas et al. | |

(Continued)

FOREIGN PATENT DOCUMENTS

| | | |
|---|---|---|
| EP | 1561640 A2 | 8/2005 |
| EP | 2833338 A1 | 2/2015 |
| WO | WO2011106661 A1 | 9/2011 |

OTHER PUBLICATIONS

European Patent Office Search Report, dated Aug. 21, 2017, regarding Application No. 17158607.7, 11 pages.

(Continued)

*Primary Examiner* — Seokjin Kim
(74) *Attorney, Agent, or Firm* — Yee & Associates, P.C.

(57) ABSTRACT

A method and apparatus for managing lighting during different periods. Light is emitted from a lighting system comprised of light devices. Operation of the lighting system is controlled to create different light scenes comprising light with different spectral distributions during different periods.

20 Claims, 9 Drawing Sheets

(56) References Cited

U.S. PATENT DOCUMENTS

| | | |
|---|---|---|
| 2013/0218409 A1* | 8/2013 | Blain ................. B64D 11/0015 |
| | | 701/36 |
| 2014/0313751 A1 | 10/2014 | Abel |
| 2014/0327364 A1 | 11/2014 | Bischof et al. |
| 2015/0189723 A1 | 7/2015 | Ogawa |
| 2015/0257224 A1 | 9/2015 | Timm et al. |
| 2015/0358002 A1 | 12/2015 | Startin et al. |
| 2015/0375865 A1 | 12/2015 | Fischer et al. |
| 2017/0069194 A1 | 3/2017 | Sharma |
| 2017/0189640 A1* | 7/2017 | Sadwick ............ H05B 37/0272 |

OTHER PUBLICATIONS

Office Action, dated Oct. 24, 2016, regarding U.S. Appl. No. 15/151,749, 17 pages.
Final Office Action, dated Feb. 14, 2017, regarding U.S. Appl. No. 15/151,749, 17 pages.
Office Action, dated Mar. 8, 2018, regarding U.S. Appl. No. 15/151,749, 32 pages.
Notice of Allowance, dated Sep. 24, 2018, regarding U.S. Appl. No. 15/151,749, 10 pages.

* cited by examiner

TUNED LIGHTING

This application is a continuation of U.S. patent application Ser. No. 15/151,749, filed on May 11, 2016, now U.S. Pat. No. 10,202,194, which is incorporated herein by reference in its entirety.

BACKGROUND INFORMATION

1. Field

The present disclosure relates generally to aircraft lighting and, in particular, to lighting within an interior of an aircraft. Still more particularly, the present disclosure relates to a method for controlling the lighting in an aircraft to create different light scenes during different periods of flight to improve an overall flight experience of persons onboard the aircraft.

2. Background

Passengers onboard an aircraft may participate in various activities during the flight of the aircraft. For example, prior to a taxiing phase of flight or a takeoff phase of flight, passengers may be fastening their seat belts, adjusting their seats, walking through the aisles, or engaging in other activities. During a cruise phase of flight, passengers may choose to relax or rest. For example, in some cases, some passengers may choose to sleep during a large portion of the cruise phase of flight when flying overnight. Further, passengers may become more attentive or they may wakeup from their sleep when it is time to land or when meals are being served. It may be desirable to improve the overall flight experience and well-being of passengers over the course of an entire flight. Therefore, it would be desirable to have a method and apparatus that take into account at least some of the issues discussed above, as well as other possible issues.

SUMMARY

In one illustrative example, an apparatus comprises a lighting system and a control system that controls operation of the lighting system. The lighting system is comprised of a set of light devices capable of emitting light of different wavelengths and positioned within an interior of an aircraft. The control system that controls operation of the lighting system creates different light scenes during different periods of flight of the aircraft. The different light scenes and the different periods of flight are selected to improve an overall well-being and flight experience of persons onboard the aircraft during a flight of the aircraft. The different light scenes comprise a first light scene, a second light scene, and a third light scene. The first light scene has a first spectral distribution that includes a first light having a first wavelength between about 436 nanometers and about 486 nanometers. The second light scene has a second spectral distribution that includes a second light having a second wavelength between about 606 nanometers about 656 nanometers. The third light scene has a third spectral distribution that includes a third light having a third wavelength between about 530 nanometers and about 580 nanometers.

In another illustrative example, a method is provided for emitting different types of light during a flight of an aircraft. Light is emitted from a lighting system comprised of a set of light devices positioned within an interior of the aircraft. Operation of the lighting system is controlled to create a first light scene during a first set of periods of flight. The first light scene has a first spectral distribution that includes a first light having a first wavelength of between about 436 nanometers and about 486 nanometers. Operation of the lighting system is controlled to create a second light scene during a second set of periods of flight. The second light scene has a second spectral distribution that includes a second light having a second wavelength between about 606 nanometers to about 656 nanometers. Operation of the lighting system is controlled to create a third light scene during a third set of periods of flight. The third light scene has a third spectral distribution that includes a third light having a third wavelength between about 530 nanometers and about 580 nanometers. Creating different light scenes at different periods of flight improves an overall well-being and flight experience of persons onboard the aircraft during the flight.

In yet another illustrative example, a method is provided for emitting different types of light during a flight of an aircraft. Light is emitted from a lighting system comprised of a set of light devices positioned within an interior of the aircraft. Operation of the lighting system is controlled according to a selected schedule for generating different light scenes during different periods of flight to improve an overall well-being and flight experience of persons onboard the aircraft during the flight. Each of the different light scenes has a unique spectral distribution. The selected schedule includes a first light scene having a first spectral distribution that includes a first light having a first wavelength of between about 436 nanometers and about 486 nanometers. The selected schedule includes a second light scene having a second spectral distribution that includes a second light having a second wavelength between about 606 nanometers to about 656 nanometers.

The features and functions can be achieved independently in various examples of the present disclosure or may be combined in yet other examples in which further details can be seen with reference to the following description and drawings.

BRIEF DESCRIPTION OF THE DRAWINGS

The novel features believed characteristic of the illustrative examples are set forth in the appended claims. The illustrative examples, however, as well as a preferred mode of use, further objectives and features thereof, will best be understood by reference to the following detailed description of an illustrative example of the present disclosure when read in conjunction with the accompanying drawings, wherein:

DETAILED DESCRIPTION

The illustrative examples recognize and take into account different considerations. For example, the illustrative examples recognize and take into account that it may be desirable to create different light scenes during a flight of an aircraft using light that is chosen to improve an overall experience and well-being of persons onboard the aircraft. In particular, the illustrative examples take into account that light of certain wavelengths may allow a passenger of an aircraft to experience certain phases of flight in an improved manner.

Thus, the illustrative examples provide a method and apparatus for emitting light during a flight of an aircraft to create different light scenes during different periods of flight. In one illustrative example, a method is provided for emitting different types of light during a flight of an aircraft. Light is emitted from a lighting system comprised of a set of light devices positioned within an interior of the aircraft. Operation of the lighting system is controlled according to a selected schedule for generating different light scenes during different periods of flight to improve an overall well-being and flight experience of persons onboard the aircraft during the flight. Each of the different light scenes has a unique spectral distribution. The selected schedule includes a first light scene having a first spectral distribution that includes a first light having a first wavelength of between about 436 nanometers and about 486 nanometers. The selected schedule includes a second light scene having a second spectral distribution that includes a second light having a second wavelength between about 606 nanometers to about 656 nanometers. In some cases, the selected schedule also includes a third light scene having a third spectral distribution that includes a third light having a third wavelength between about 530 nanometers and about 580 nanometers.

The first light scene, the second light scene, and the third light scene may be created one or more times during different periods of flight. Further, the sequence in which these light scenes is created and the duration of time for which each light scene is emitted is selected to improve an overall well-being and flight experience of persons onboard the aircraft during the flight.

Figure 1:
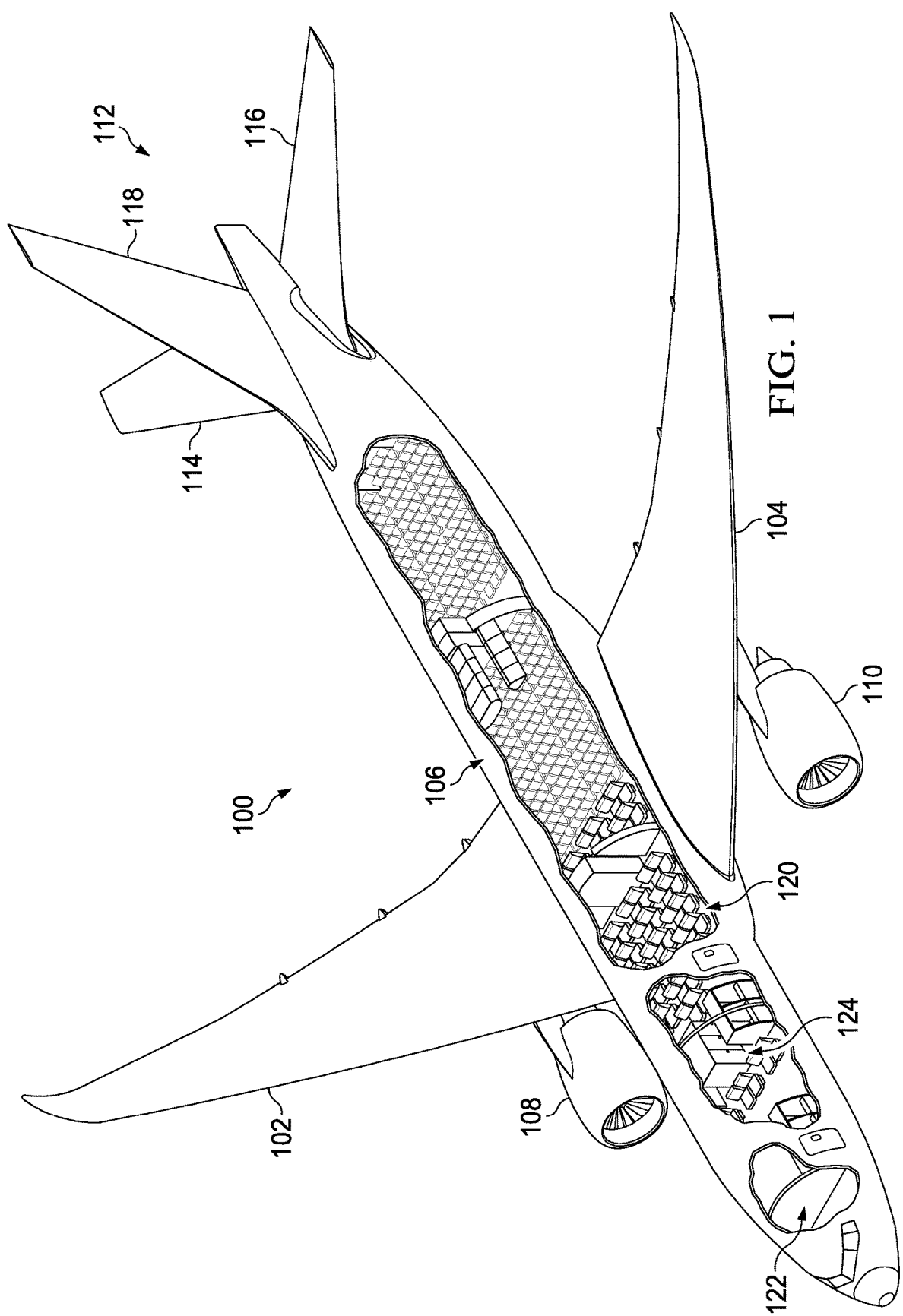
FIG. 1 is an illustration of a cut-away view of an aircraft in accordance with an illustrative example.

Referring now to the figures and, in particular, with reference to FIG. 1, an illustration of a cut-away view of an aircraft is depicted in accordance with an illustrative example. In this illustrative example, aircraft 100 includes wing 102 and wing 104 attached to fuselage 106.

Aircraft 100 also includes engine 108 attached to wing 102 and engine 110 attached to wing 104. Further, aircraft 100 includes tail section 112. Horizontal stabilizer 114, horizontal stabilizer 116, and vertical stabilizer 118 are attached to tail section 112.

In FIG. 1, a cutaway view of aircraft 100 is depicted such that passenger cabin 120, cockpit 122, and lavatories 124 may be seen. Aircraft 100 has a lighting system (not shown) that is controlled using a control system (not shown). The control system controls the lighting system to create different light scenes during different periods of flight of aircraft 100.

As used herein, a period of flight may be a phase of flight, some selected time period during the flight, or the period of time over which some activity occurs onboard aircraft 100. A phase of flight may be, for example, without limitation, taxiing, takeoff, cruising, landing, holding, or some other phase of flight.

The different light scenes during the different periods of flight may improve the overall flight experience of persons onboard aircraft 100. For example, the control system may control the lighting system to create different light scenes in passenger cabin 120 that improve the well-being of the passengers in passenger cabin 120 during the flight of the aircraft.

Figure 2:
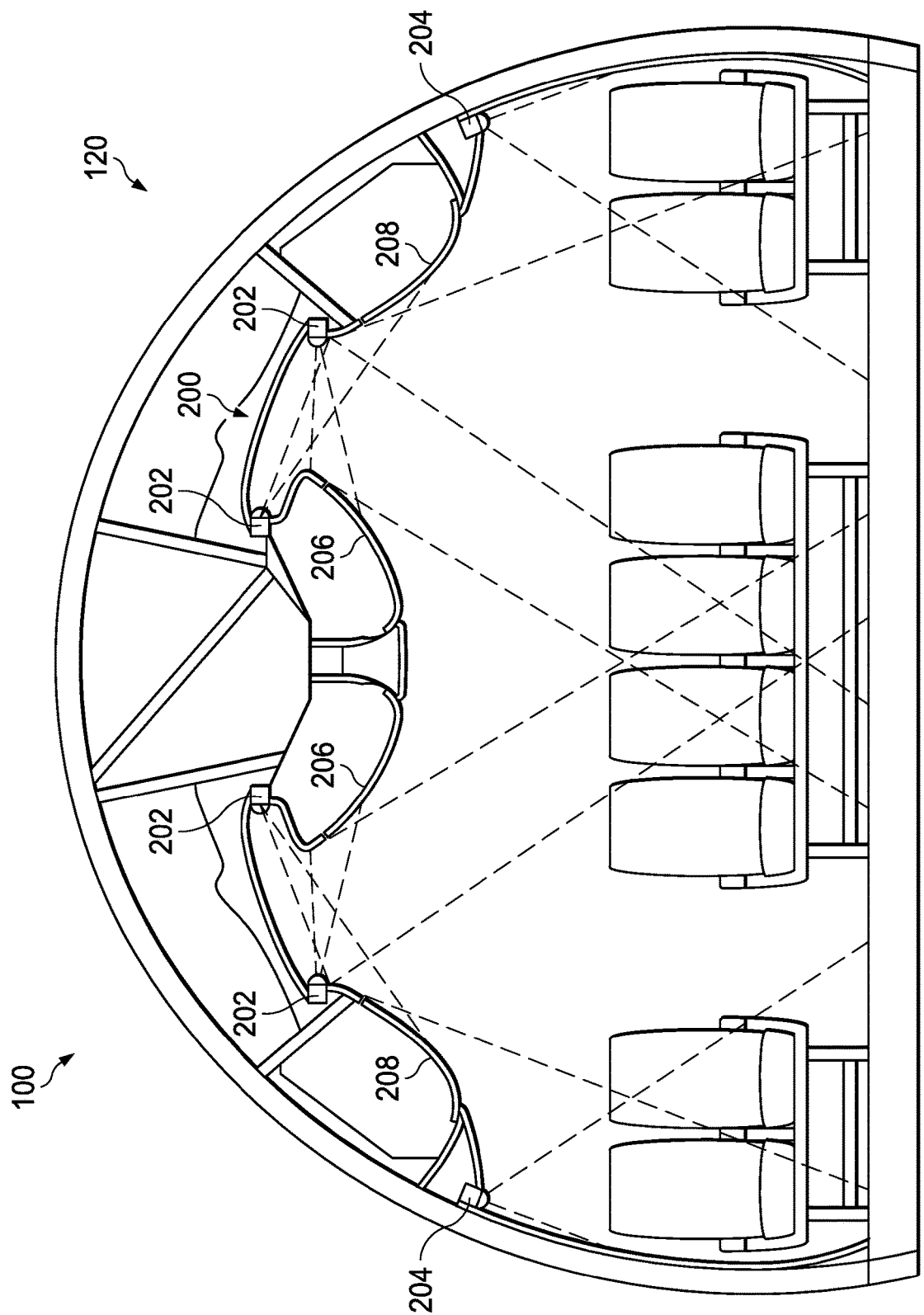
FIG. 2 is an illustration of the passenger cabin of the aircraft from FIG. 1 in accordance with an illustrative example.

With reference now to FIG. 2, an illustration of passenger cabin 120 of aircraft 100 from FIG. 1 is depicted in accordance with an illustrative example. In this illustrative example, lighting system 200 includes various devices positioned within passenger cabin 120.

In this illustrative example, lighting system 200 includes ceiling light devices 202 and sidewall light devices 204. Ceiling light devices 202 may be positioned between inboard stowage bins 206 and outboard stowage bins 208 on each side of passenger cabin 120. Further, sidewall light devices 204 are positioned on the side walls of passenger cabin 120 below outboard stowage bins 206.

A control system (not shown) may be used to control the operation of lighting system 200. In particular, the control system may control lighting system 200 to create different light scenes during different periods of flight according to a selected schedule to improve the overall flight experience and well-being of persons onboard aircraft 100.

In one illustrative example, three different types of light scenes may be created using lighting system 200. Any combination or sequencing of these three different light scenes may be created during a flight of aircraft 100.

As one illustrative example, lighting system 200 may create a first light scene having a first spectral distribution. This first spectral distribution may include blue light having a wavelength that is about 461 nanometers. This first light scene may be created during a cruise phase of flight, a sleeping period of flight, or some other period of time during the flight. Lighting system 200 emits the first spectral distribution in a manner such that a color of the ambient light perceived by persons onboard aircraft 100 is not a saturated blue light but such that a sufficient amount of blue light is emitted for a sufficient duration to promote the desired effect for the well-being and overall flight experience of persons onboard aircraft 100.

In particular, by emitting blue light having the wavelength of about 461 nanometers during certain periods of flight, the flight experience of persons onboard aircraft 100 during these periods of flight is improved. Depending on the implementation, the well-being and overall flight experience of passengers 318 may be improved by the control system causing lighting system 200 to emit this blue light in pulses or for a selected time interval such as, but not limited to, 5 minutes, 10 minutes, 15 minutes, 30 minutes, 60 minutes, or 100 minutes.

Further, lighting system 200 may create a second light scene having a second spectral distribution during a landing phase of flight, a disembarkation period of flight, a taxiing phase of flight, a wakeup period of flight, an emergency phase of flight, or some other period of time during the flight. This second spectral distribution may include red light having a wavelength of about 631 nanometers. The second spectral distribution is generated in a manner such that a color of the ambient light perceived by persons onboard aircraft 100 is not a saturated red light but such that a sufficient amount of red light is emitted for a sufficient duration to promote the desired effect for the well-being and overall flight experience of persons onboard aircraft 100.

By emitting the red light having the wavelength of about 631 nanometers during certain periods of flight, the flight experience of passengers 318 during these periods of flight is improved. Depending on the implementation, the well-being and overall flight experience of passengers 318 may be improved by the control system causing lighting system 200 to emit this red light in pulses or for a selected time interval such as, but not limited to, 5 minutes, 10 minutes, 15 minutes, 30 minutes, or 60 minutes.

In some cases, lighting system 200 may create a third light scene having a third spectral distribution during a boarding period of flight, a taxiing phase of flight, a takeoff phase of flight, or some other period of time during the flight. This third spectral distribution includes green light having a wavelength of about 555 nanometers. The third spectral distribution is generated in a manner such that a color of the ambient light perceived by persons onboard aircraft 100 is not a saturated green light but such that a sufficient amount of green light is emitted for a sufficient duration to promote the desired effect for the well-being and overall flight experience of persons onboard aircraft 100.

By emitting the green light having the wavelength of about 555 nanometers during certain periods of flight, the flight experience of persons onboard aircraft 100 during these periods of flight is improved. Depending on the implementation, the well-being and overall flight experience of passengers 318 may be improved by the control system causing lighting system 200 to emit this green light in pulses or for a selected time interval such as, but not limited to, 5 minutes, 10 minutes, 15 minutes, 30 minutes, or 60 minutes.

The selected schedule according to which the different light scenes are created during the flight of aircraft 100 identifies which light scene is generated during a particular period of flight and the duration of that light scene. A particular light scene, such as the first light scene, the second light scene, or the third light scene, may be created any number of times according to selected schedule.

In other words, depending on the implementation, the selected schedule may include one or more of the light scenes being created multiple times over the course of a single flight of aircraft 100. Further, while a light scene may be repeated multiple times in the selected schedule, the duration of each repetition may be the same or different.

A person onboard aircraft 100 may experience each light scene created by the control system and lighting system 200 differently due to the different wavelengths of the light emitted during the light scenes. Further, a person may experience the same light scene differently when exposed to that light scene for different lengths of time.

For example, a person may more easily be awakened from sleep or experience a higher level of alertness when exposed to a sufficient amount of red light having a wavelength of about 631 nanometers for a sufficient duration of time. In some cases, this effect may remain for a period of time after the red light is no longer being emitted.

Figure 3:
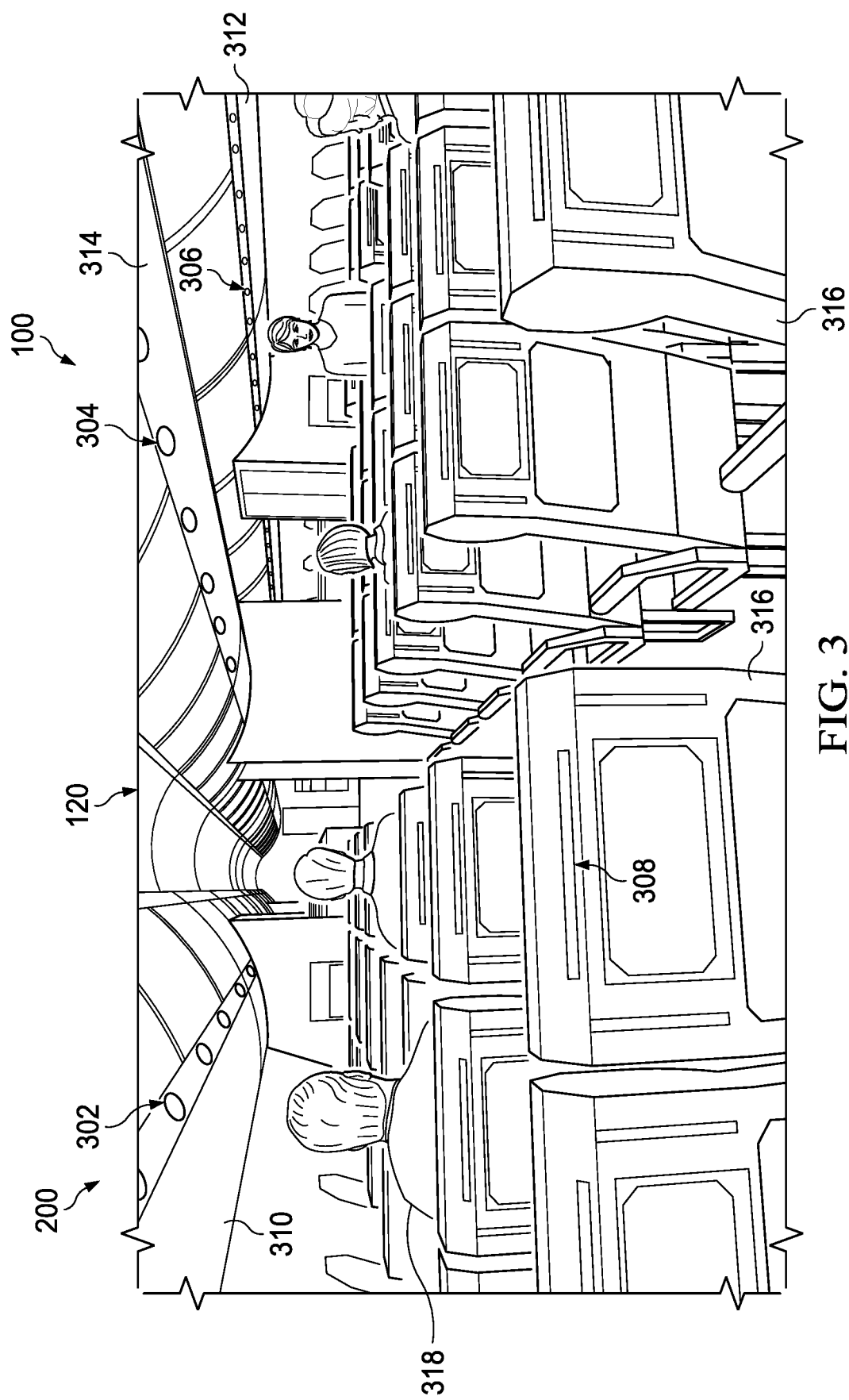
FIG. 3 is an illustration of the passenger cabin of the aircraft from FIG. 1 in accordance with an illustrative example.

With reference now to FIG. 3, an illustration of passenger cabin 120 of aircraft 100 from FIG. 1 is depicted in accordance with an illustrative example. In this illustrative example, a different configuration for lighting system 200 from FIG. 2 is shown positioned within passenger cabin 120. Depending on the implementation, lighting system 200 may include other lighting devices in addition to or in place of the various lighting devices described in FIG. 2.

For example, without limitation, lighting system 200 may include first plurality of light devices 302, second plurality of light devices 304, third plurality of light devices 306, and fourth plurality of light devices 308. As depicted, first plurality of light devices 302 is attached to left outboard ceiling 310. Second plurality of light devices 304 is attached to right outboard ceiling 314. Third plurality of light devices 306 is attached to inboard ceiling 312. Further, fourth plurality of light devices 308 is attached to seats 316 in passenger cabin 120.

Figure 4:
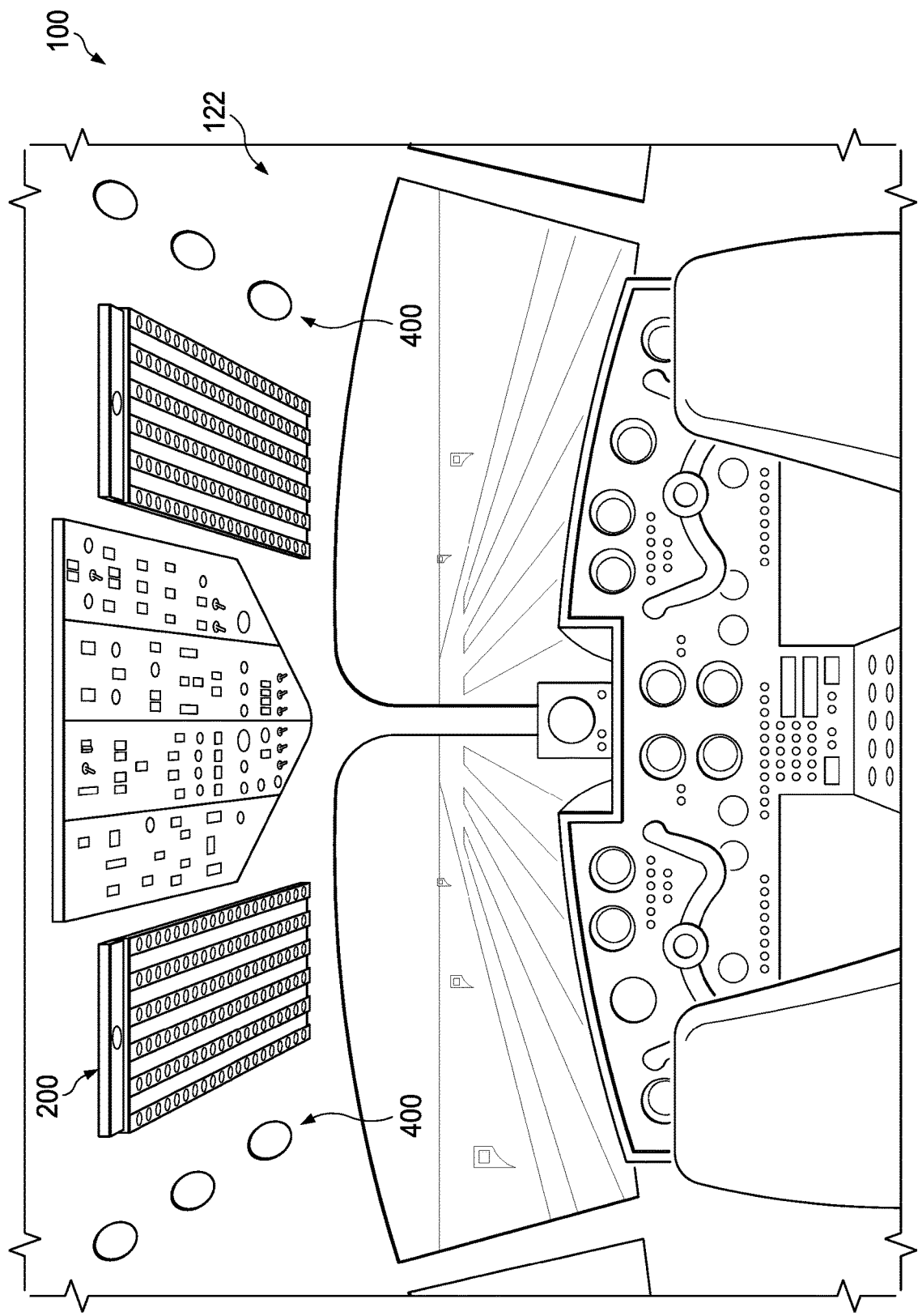
FIG. 4 is an illustration of the cockpit of the aircraft from FIG. 1 in accordance with an illustrative example.

With reference now to FIG. 4, an illustration of cockpit 122 of aircraft 100 from FIG. 1 is depicted in accordance with an illustrative example. In this illustrative example, lighting system 200 from FIG. 3 includes fifth plurality of light devices 400 in cockpit 122. Fifth plurality of light devices 400 may be used to create different light scenes in cockpit 122 during different periods of flight of aircraft 100.

In one illustrative example, fifth plurality of light devices 400 is controlled independently of the other light devices of lighting system 200 in FIG. 3. In this manner, the light scenes that are produced in cockpit 122 may be the same or different from the light scenes that are produced in passenger cabin 120 in FIG. 3. For example, without limitation, lighting system 200 may generate light scenes according to a first selected schedule in passenger cabin 120 in FIG. 3 but according to a second selected schedule in cockpit 122.

Figure 5:
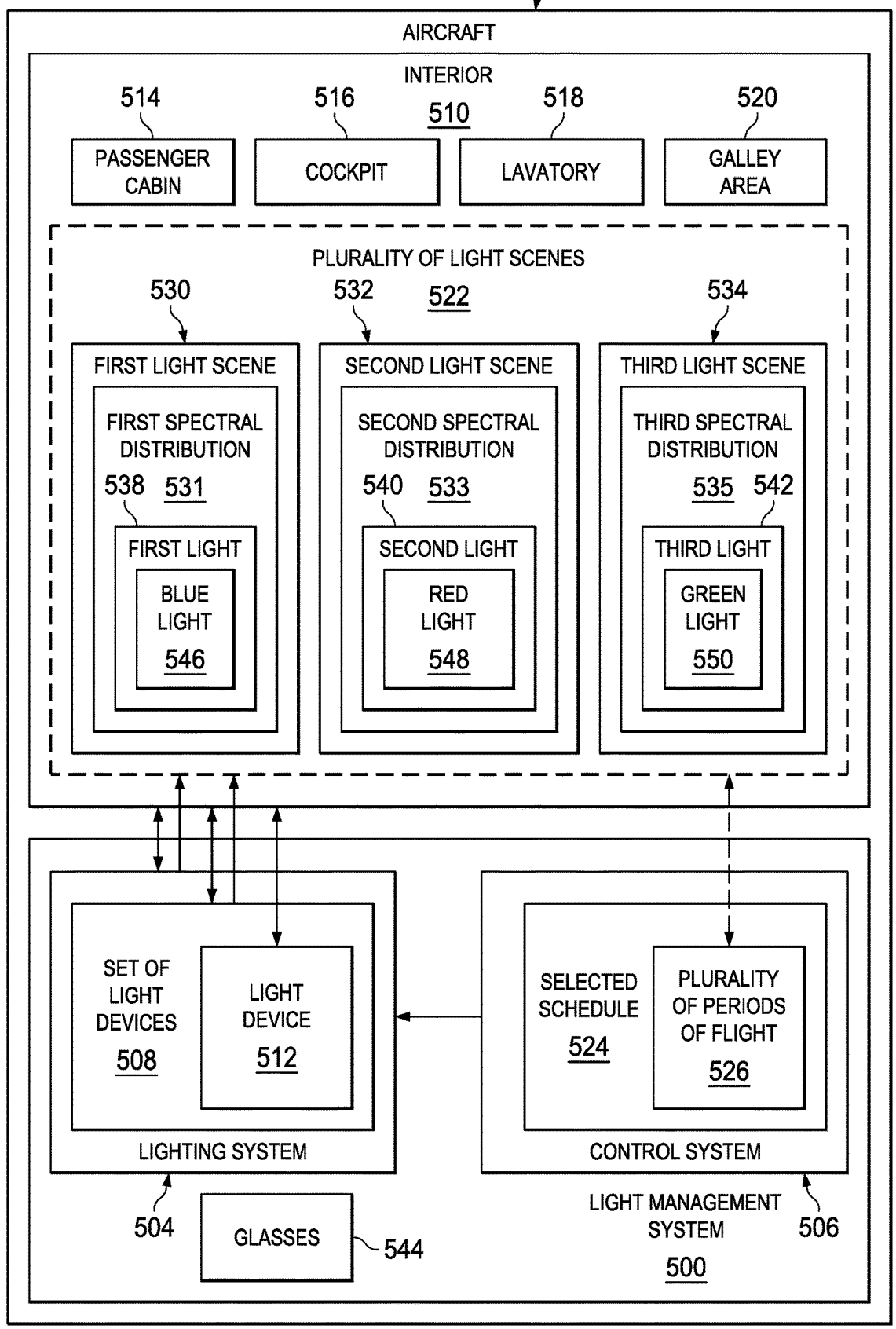
FIG. 5 is an illustration of a light management system in the form of a block diagram in accordance with an illustrative example.

Referring now to FIG. 5, an illustration of a light management system is depicted in the form of a block diagram in accordance with an illustrative example. In this illustrative example, light management system 500 is at least partially located onboard aircraft 502. Aircraft 100 in FIGS. 1-3 is an example of one implementation for aircraft 502.

As depicted, light management system 500 includes lighting system 504 and control system 506. Lighting system 200 in FIGS. 2-4 may be an example of one implementation for lighting system 504.

In this illustrative example, lighting management system 500 includes set of light devices 508. As used herein, a "set of" items may include one or more items. For example, set of light devices 508 may include one or more light devices. Set of light devices 508 is positioned within interior 510 of aircraft 502.

Light device 512 is an example of one of set of light devices 508. Light device 512 may take the form of a luminaire, an electric light device, or some other type of light device capable of being spectrally tuned over a selected range of wavelengths. This selected range of wavelengths may be, for example, without limitation, the entire visible spectrum between about 390 nanometers and about 700 nanometers.

Light device 512 may be positioned within passenger cabin 514, cockpit 516, lavatory 518, galley area 520, or some other area of interior 510 of aircraft 502. Depending on the implementation, light device 512 may be positioned on, attached to, integrated as a part of, or otherwise associated with a ceiling of interior 510, an interior side panel of aircraft 502, a seat inside passenger cabin 514, a console inside cockpit 516, a wall in lavatory 518, a stowage bin, a passenger service unit, or some other structure inside aircraft 502. In some cases, light device 512 may be positioned directly above a passenger seat.

In some illustrative examples, set of light devices 508 is positioned within interior 510 to direct light towards at least one of an outboard ceiling, an inboard ceiling, an outboard stowage bin, an inboard stowage bin, one or more seats, a floor, an aisle, or some other structure inside aircraft 502. In other illustrative examples, each light device in set of light devices 508 may be positioned to direct light towards an outboard ceiling, an inboard ceiling, an outboard stowage bin, an inboard stowage bin, one or more seats, or some other structure inside aircraft 502.

As used herein, the phrase "at least one of," when used with a list of items, means different combinations of one or more of the listed items may be used and only one of the items in the list may be needed. The item may be a particular object, thing, step, operation, process, or category. In other words, "at least one of" means any combination of items or number of items may be used from the list, but not all of the items in the list may be required.

For example, without limitation, "at least one of item A, item B, or item C" or "at least one of item A, item B, and item C" may mean item A; item A and item B; item B; item A, item B, and item C; item B and item C; or item A and C. In some cases, "at least one of item A, item B, or item C" or "at least one of item A, item B, and item C" may mean, but is not limited to, two of item A, one of item B, and ten of item C; four of item B and seven of item C; or some other suitable combination.

Control system 506 controls operation of lighting system 504 to create different light scenes at different periods of flight of aircraft 502. These different light scenes and the different periods of flight are paired to improve an overall well-being and flight experience of persons onboard aircraft 502 during the flight.

For example, without limitation, control system 506 controls set of light devices 508 to generate plurality of light scenes 522 according to selected schedule 524. Selected schedule 524 may be managed in the form of a software file, a database, a spreadsheet, or some other type of data structure. Selected schedule 524 identifies plurality of periods of flight 526. In one illustrative example, plurality of light scenes 522 includes first light scene 530, second light scene 532, and third light scene 534.

First light scene 530 has first spectral distribution 531 that includes first light 538 having a first wavelength that is between about 426 nanometers and about 486 nanometers. This range of wavelengths is selected based on the one or more particular periods of flight during which first light scene 530 is to be generated. For example, first light scene 530 may be designated for generation during at least one of a cruise phase of flight, a sleeping period of flight, or some other period of flight.

In one illustrative example, first light 538 takes the form of blue light 546 having a wavelength of about 461 nanometers. Blue light 546 may be emitted for a time interval of about 3 minutes to about 60 minutes during a cruise phase of flight or a sleeping period of flight. The time interval may be selected to aid in improving the well-being and overall passenger flight experience, as well as enable improved after-flight experience. This wavelength of blue light 546 may be optimal for promoting passenger well-being during a cruise phase of flight, to sleep more restfully during the sleeping period of an overnight flight, or both. Blue light 546 may help promote alertness in a manner that works with passenger circadian rhythms to improve overall passenger well-being.

Creating first light scene 530 may also include emitting light of other wavelengths in addition to blue light 546 having the wavelength of about 461 nanometers. First light scene 530 is emitted such that the color of the ambient light perceived by a person onboard aircraft 502 is not a saturated blue. However, sufficient blue light 546 is emitted for a sufficient period of time to achieve the desired effect in the promotion of the well-being and overall flight experience of persons onboard aircraft 502.

Second light scene 532 has second spectral distribution 533 that includes second light 540 having a second wavelength that is between about 606 nanometers and about 656 nanometers. This range of wavelengths is selected based on the one or more particular periods of flight during which second light scene 532 is to be generated. For example, second light scene 532 may be designated for generation during at least one of a landing phase of flight, a disembarkation period of flight, an emergency period of flight, a wakeup period of flight, or some other period of flight.

In one illustrative example, second light 540 takes the form of red light 548 having a wavelength of about 631 nanometers. Red light 548 may be emitted for a time interval of about 3 minutes to about 20 minutes during a landing phase of flight, a disembarkation period of flight, a wakeup period of flight, a breakfast period of flight, a lunch period of flight, a dinner period of flight, a snacking period of flight, an emergency period of flight, or some other period of flight.

This wavelength of red light 548 may be optimal for allowing a passenger onboard aircraft 502 to more easily become alert, stay alert, wake up after a sleeping period, or a combination thereof. Red light 548 may be used to promote alertness during certain periods of flight, independently of passenger circadian rhythms. The time interval over which red light 548 is emitted may be selected to aid in improving the well-being and overall passenger flight experience, as well as to enable an improved after-flight experience.

Creating second light scene 532 may also include emitting light of other wavelengths in addition to red light 548 having the wavelength of about 631 nanometers. Second light scene 532 is emitted such that the color of the ambient light perceived by a person onboard aircraft 502 is not a saturated red. In some cases, the color of the ambient light is white or amber. However, sufficient red light 548 is emitted for a sufficient period of time to achieve the desired effect in the promotion of the well-being and overall flight experience of persons onboard aircraft 502.

Further, third light scene 534 has third spectral distribution 535 that includes third light 542 having a third wavelength that is between about 530 nanometers and about 580 nanometers. This range of wavelengths is selected based on the one or more particular periods of flight during which third light scene 534 is to be generated. For example, third light scene 534 may be designated for generation during at least one of a boarding period of flight, a taxiing phase of flight, a takeoff period of flight, or some other period of flight.

In one illustrative example, third light 542 takes the form of green light 550 having a wavelength of about 555 nanometers. Green light 550 may be for a time interval of about 3 minutes to about 45 minutes during a boarding period of flight, a taxiing phase of flight, a takeoff period of flight, or some other period of flight. The time interval may be selected to aid in improving the well-being and overall passenger flight experience, as well as to enable an improved after-flight experience.

Creating third light scene 534 may also include emitting light of other wavelengths in addition to the green light 550 having the wavelength of about 555 nanometers. Third light scene 534 is emitted such that the color of the ambient light perceived by a person onboard aircraft 502 is not a saturated green. However, sufficient green light 550 is emitted for a sufficient period of time to achieve the desired effect in the promotion of the well-being and overall flight experience of persons onboard aircraft 502.

Any number of sets of light devices similar to set of light devices 508 may be used throughout interior 510 of aircraft 502. In this manner, depending on selected schedule 524, different light scenes may be generated in different locations of aircraft 502 during a same period of flight.

Control system 506 may be implemented in software, hardware, firmware, or a combination thereof. When software is used, the operations performed by control system 506 may be implemented using, for example, without limitation, program code configured to run on a processor unit. When firmware is used, the operations performed by control system 506 may be implemented using, for example, without limitation, program code and data and stored in persistent memory to run on a processor unit.

When hardware is employed, the hardware may include one or more circuits that operate to perform the operations performed by control system 506. Depending on the implementation, the hardware may take the form of a circuit system, an integrated circuit, an application specific integrated circuit (ASIC), a programmable logic device, or some other suitable type of hardware device configured to perform any number of operations.

A programmable logic device may be configured to perform certain operations. The device may be permanently configured to perform these operations or may be reconfigurable. A programmable logic device may take the form of, for example, without limitation, a programmable logic array, a programmable array logic, a field programmable logic array, a field programmable gate array, or some other type of programmable hardware device.

In one illustrative example, control system 506 is implemented in a computer system located onboard aircraft 502. This computer system may include a single computer or multiple computers in communication with each other. Control system 506 may communicate with lighting system 504 using at least one of a wired communications link, a wireless communications link, an optical communications link, or some other type of communications link.

In some cases, control system 506 may be integrated with a flight control system of aircraft 502. Depending on the implementation, control system 506 may be accessible by a user through cockpit 516, passenger cabin 514, galley area 520, or some other area of interior 510 of aircraft 502.

In one illustrative example, lighting system 504 may include at least one light device attached to each passenger seat in aircraft 502. In this example, control system 506 may include a computerized device located at each passenger seat in aircraft 502 that gives the passenger control of the light device at that passenger seat. In this manner, a passenger may control which light scene of plurality of light scenes 522 is created around the passenger based on the particular experience or effect desired by the passenger.

In some illustrative examples, light device 512 may be permanently attached to or attachable to glasses 544 that may be worn by a passenger. Glasses 544 may be a pair of glasses that is spectrally tunable. In other words, glasses 544 may be controlled to emit plurality of light scenes 522. In one illustrative example, glasses 544 may have a control module that allows a passenger to control which light scene of plurality of light scenes 522 is created and for how long that light scene is generated through glasses 544.

Control system 506 may include a computer or processor that is located off of aircraft 502. For example, control system 506 may be at least partially located at a ground station or air traffic tower. In some cases, the ground station may control lighting system 504 wirelessly.

The illustration of lighting management system 500 is not meant to imply physical or architectural limitations to the manner in which an illustrative example may be implemented. Other components in addition to or in place of the ones illustrated may be used. Some components may be optional. Also, the blocks are presented to illustrate some functional components. One or more of these blocks may be combined, divided, or combined and divided into different blocks when implemented in an illustrative example.

For example, set of light devices 508 may be positioned near sleeping bunks for flight crew members in aircraft 502. In some cases, each sleeping bunk may be outfitted with its own set of light devices.

In some illustrative examples, lighting system 200 may be configured such that each passenger can control the light scene that is created around the passenger. As one illustrative example, using a touch screen system located in front of a passenger, the passenger may select one schedule from a plurality of potential schedules for controlling light device 512 that is located above, beneath, to the side of, or otherwise near the passenger. In this example, control system 506 receives this selection and controls the light scenes generated by light device 512 during the course of the flight. Similarly, a passenger may be given the opportunity to select which particular light scene of plurality of light scenes 522 the passenger wants to experience during the flight of aircraft 502 at any given point in time.

In other illustrative examples, plurality of light scenes 522 may include a fourth light scene that includes amber light having a wavelength of about 590 nanometers. This fourth light scene may be used in, for example, without limitation, a passenger cabin, an animal storage area, or both inside aircraft 502. The fourth light scene may improve the flight experience of the passengers or the animals during transit. For example, without limitation, the passengers or the animals may be more easily calmed and made comfortable during the flight through exposure to the fourth light scene.

In other illustrative examples, a passenger onboard aircraft 502 may be able to input a flight record locator designator, as well as personal preferences, into a website application, an In-Flight Entertainment (IFE) application, or a cellphone application. An individual selected schedule may be "prescribed" for the passenger based on the personal preferences of the passenger. The individual selected schedule may include various light scenes that would be useful to the passenger in acclimating during flight to a particular destination. In this manner, each passenger onboard aircraft 502 may be able to manage their own flight experience using lighting.

Figure 6:
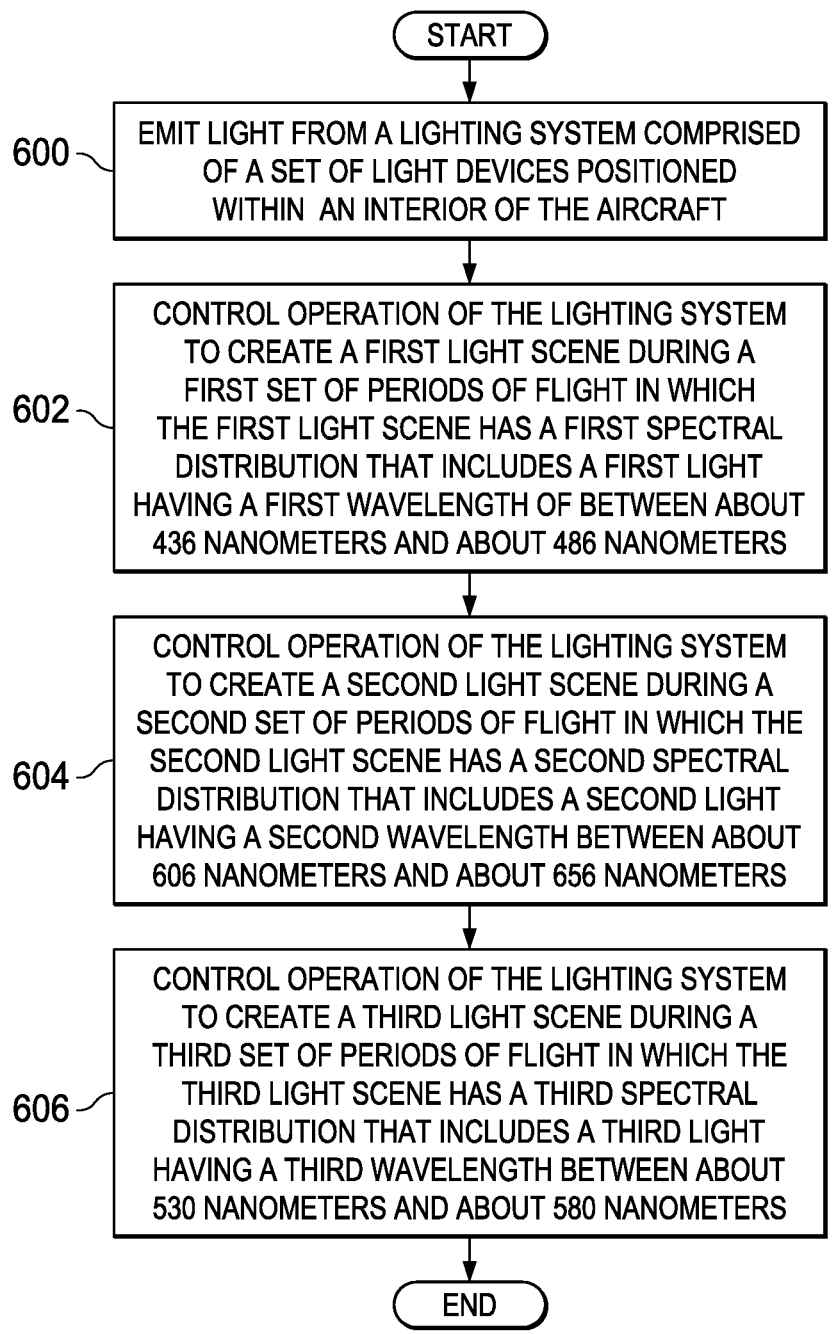
FIG. 6 is an illustration of a process for emitting light during a flight of an aircraft in the form of a flowchart in accordance with an illustrative example.

With reference now to FIG. 6, an illustration of a process for emitting light during a flight of an aircraft is depicted in the form of a flowchart in accordance with an illustrative example. The process illustrated in FIG. 6 may be implemented using light management system 500 described in FIG. 5.

The process begins by emitting light from a lighting system comprised of a set of light devices positioned within an interior of the aircraft (operation 600). In operation 600, the lighting system may be lighting system 504 in FIG. 5. Operation of the lighting system is controlled to create a first light scene during a first set of periods of flight in which the first light scene has a first spectral distribution that includes a first light having a first wavelength of between about 436 nanometers and about 486 nanometers (operation 602).

Further, operation of the lighting system is controlled to create a second light scene during a second set of periods of flight in which the second light scene has a second spectral distribution that includes a second light having a second wavelength between about 606 nanometers and about 656 nanometers (operation 604). Operation of the lighting system is controlled to create a third light scene during a third set of periods of flight in which the third light scene has a third spectral distribution that includes a third light having a third wavelength between about 530 nanometers and about 580 nanometers (operation 606), with the process terminating thereafter. Creating the different light scenes at the different periods of flight in operations 602, 604, and 606, improves an overall well-being and flight experience of persons onboard the aircraft during the flight.

Figure 7:
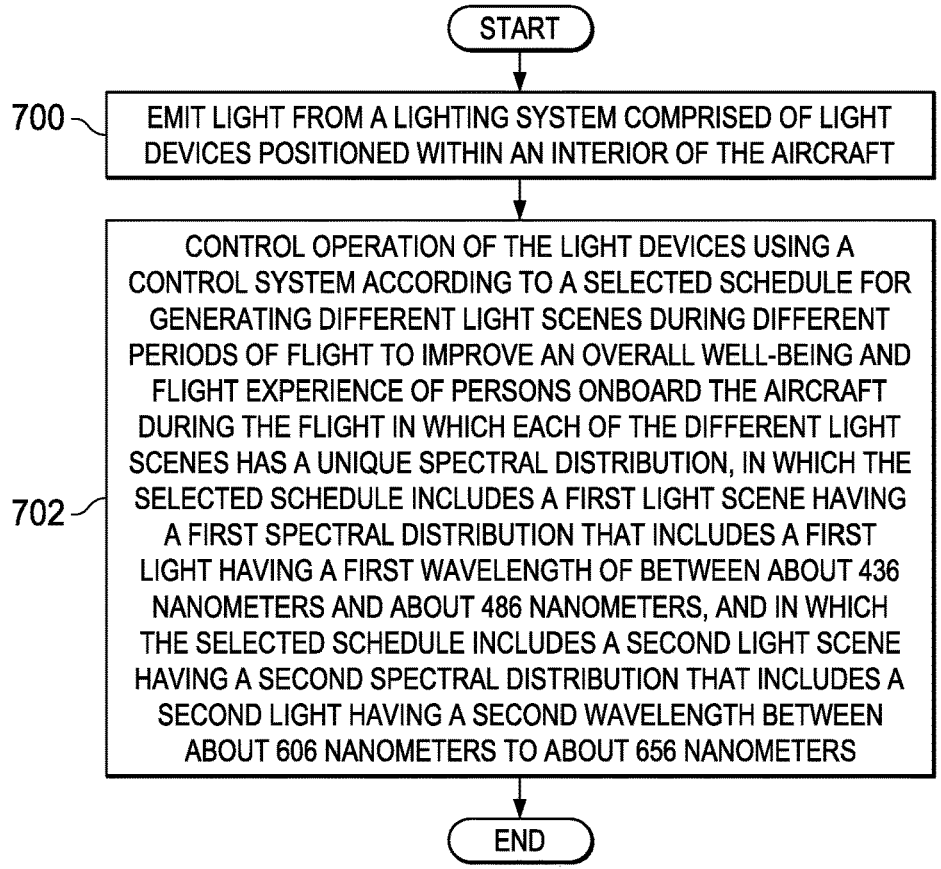
FIG. 7 is an illustration of a process for generating light scenes during a flight of an aircraft in the form of a flowchart in accordance with an illustrative example.

With reference now to FIG. 7, an illustration of a process for generating light scenes during a flight of an aircraft is depicted in the form of a flowchart in accordance with an illustrative example. The process illustrated in FIG. 7 may be implemented using light management system 500 described in FIG. 5.

The process begins by emitting light from a lighting system comprised of light devices positioned within an interior of the aircraft (operation 700). In operation 700, the lighting system may be lighting system 504 in FIG. 5.

Operation of the light devices is controlled according to a selected schedule for generating different light scenes during different periods of flight to improve an overall well-being and flight experience of persons onboard the aircraft during the flight in which each of the different light scenes has a unique spectral distribution, in which the selected schedule includes a first light scene having a first spectral distribution that includes a first light having a first wavelength of between about 436 nanometers and about 486 nanometers, and in which the selected schedule includes a second light scene having a second spectral distribution that includes a second light having a second wavelength between about 606 nanometers to about 656 nanometers (operation 702), with the process terminating thereafter.

In operation 702, the control system may be control system 506 in FIG. 5. Further, the different light scenes identified in the selected schedule may include plurality of light scenes 522 described in FIG. 5 for selected schedule 524 in FIG. 5.

Figure 8:
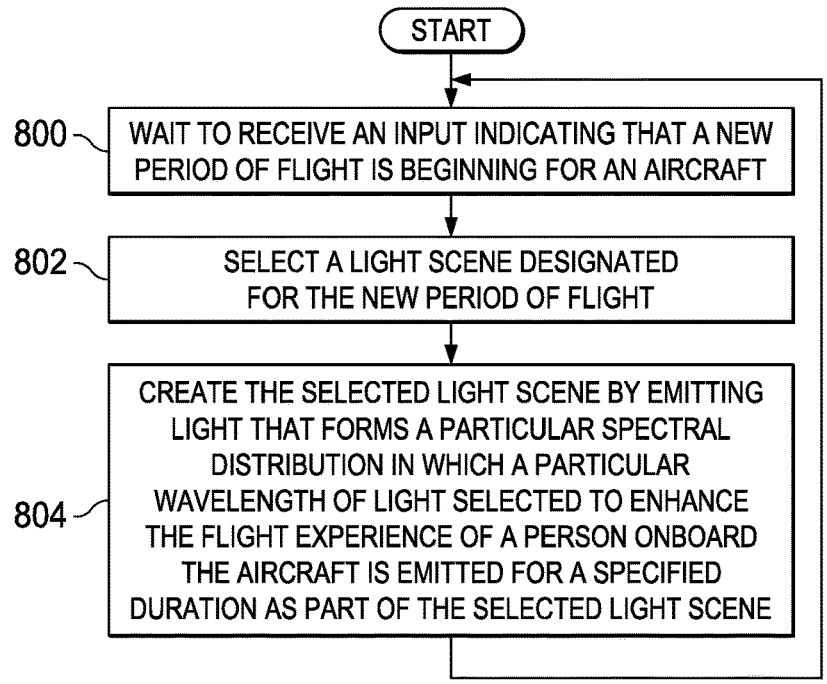
FIG. 8 is an illustration of a process for improving a passenger flight experience using light scenes in the form of a flowchart in accordance with an illustrative example.

With reference now to FIG. 8, an illustration of a process for improving a passenger flight experience using light scenes is depicted in the form of a flowchart in accordance with an illustrative example. The process illustrated in FIG. 8 may be implemented using light management system 500 in FIG. 5.

The process begins by waiting to receive an input indicating that a new period of flight is beginning for an aircraft (operation 800). In operation 800, the input may be, for example, without limitation, a user input, an output from a flight control system of the aircraft, an input based on a signal received from a landing gear system of the aircraft, or some other type of input. Further, the input may indicate that the new period of flight is beginning by identifying that a previous period of flight is ending or has ended, identifying that a timer has elapsed, or identifying that some other particular event of interest has occurred.

In response to receiving the input, a light scene designated for the new period of flight is selected (operation 802). The light scene may be, for example, without limitation, first light scene 530, second light scene 532, or third light scene 534 from FIG. 5. In some cases, the selection of the light scene in operation 802 is performed based on an existing schedule for light scenes.

Next, the selected light scene is created by emitting light of a particular wavelength that is selected to enhance the flight experience of a person onboard the aircraft for a specified duration (operation 804), with the process then returning to operation 800 described above.

The flowcharts and block diagrams in the different depicted examples illustrate the architecture, functionality, and operation of some possible implementations of apparatuses and methods in an illustrative example. In this regard, each block in the flowcharts or block diagrams may represent a module, a segment, a function, and/or a portion of an operation or step.

In some alternative implementations of an illustrative example, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Figure 9:
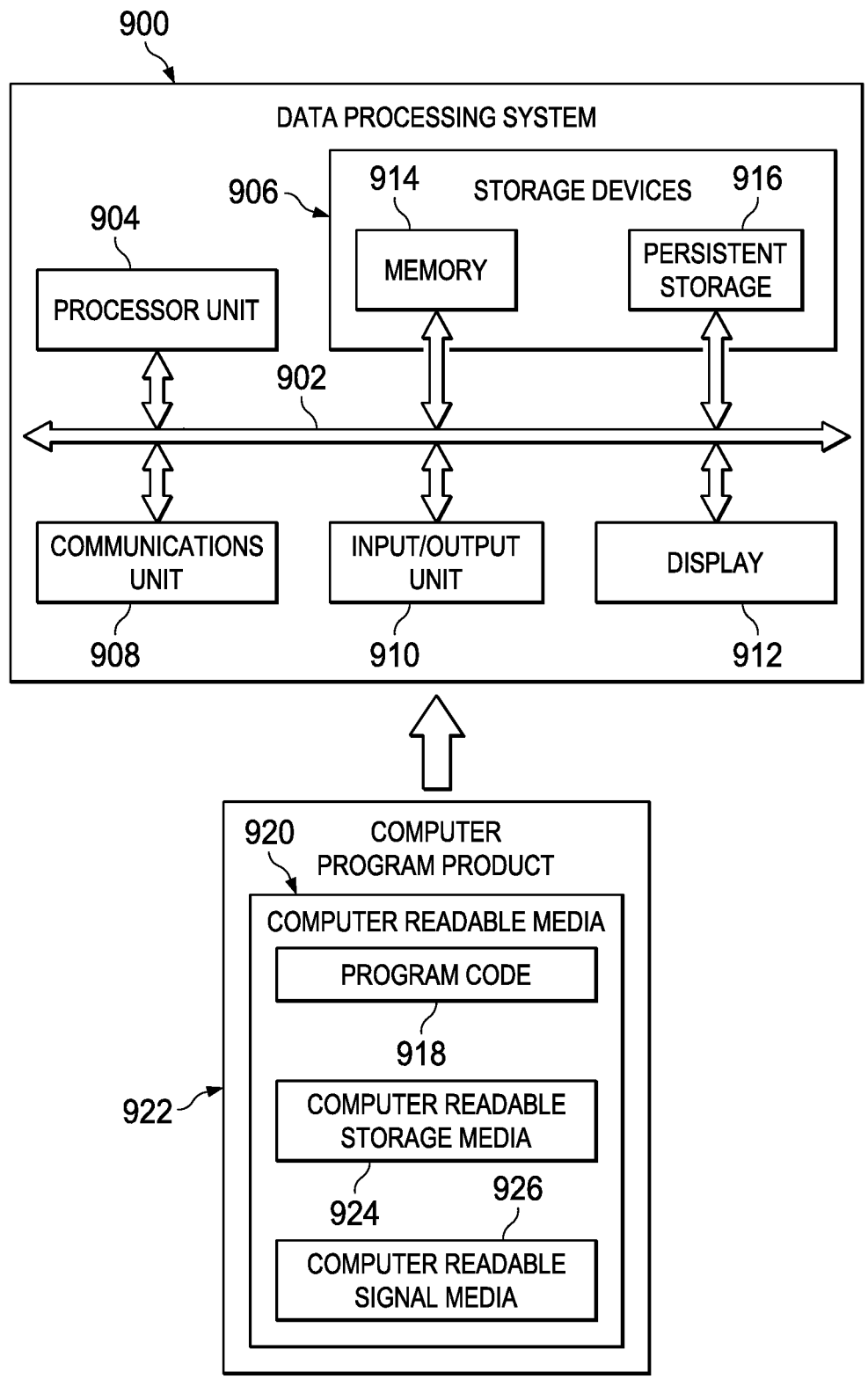
FIG. 9 is an illustration of a data processing system in the form of a block diagram in accordance with an illustrative example.

Turning now to FIG. 9, an illustration of a data processing system in the form of a block diagram is depicted in accordance with an illustrative example. Data processing system 900 may be used to implement control system 506 in FIG. 5. As depicted, data processing system 900 includes communications framework 902, which provides communications between processor unit 904, storage devices 906, communications unit 908, input/output unit 910, and display 912. In some cases, communications framework 902 may be implemented as a bus system.

Processor unit 904 is configured to execute instructions for software to perform a number of operations. Processor unit 904 may comprise a number of processors, a multi-processor core, and/or some other type of processor, depending on the implementation. In some cases, processor unit 904 may take the form of a hardware unit, such as a circuit system, an application specific integrated circuit (ASIC), a programmable logic device, or some other suitable type of hardware unit.

Instructions for the operating system, applications, and/or programs run by processor unit 904 may be located in storage devices 906. Storage devices 906 may be in communication with processor unit 904 through communications framework 902. As used herein, a storage device, also referred to as a computer readable storage device, is any piece of hardware capable of storing information on a temporary and/or permanent basis. This information may include, but is not limited to, data, program code, and/or other information.

Memory 914 and persistent storage 916 are examples of storage devices 906. Memory 914 may take the form of, for example, a random access memory or some type of volatile or non-volatile storage device. Persistent storage 916 may comprise any number of components or devices. For example, persistent storage 916 may comprise a hard drive, a flash memory, a rewritable optical disk, a rewritable magnetic tape, or some combination of the above. The media used by persistent storage 916 may or may not be removable.

Communications unit 908 allows data processing system 900 to communicate with other data processing systems and/or devices. Communications unit 908 may provide communications using physical and/or wireless communications links.

Input/output unit 910 allows input to be received from and output to be sent to other devices connected to data processing system 900. For example, input/output unit 910 may allow user input to be received through a keyboard, a mouse, and/or some other type of input device. As another example, input/output unit 910 may allow output to be sent to a printer connected to data processing system 900.

Display 912 is configured to display information to a user. Display 912 may comprise, for example, without limitation, a monitor, a touch screen, a laser display, a holographic display, a virtual display device, and/or some other type of display device.

In this illustrative example, the processes of the different illustrative examples may be performed by processor unit 904 using computer-implemented instructions. These instructions may be referred to as program code, computer usable program code, or computer readable program code and may be read and executed by one or more processors in processor unit 904.

In these examples, program code 918 is located in a functional form on computer readable media 920, which is selectively removable, and may be loaded onto or transferred to data processing system 900 for execution by processor unit 904. Program code 918 and computer readable media 920 together form computer program product 922. In this illustrative example, computer readable media 920 may be computer readable storage media 924 or computer readable signal media 926.

Computer readable storage media 924 is a physical or tangible storage device used to store program code 918 rather than a medium that propagates or transmits program code 918. Computer readable storage media 924 may be, for example, without limitation, an optical or magnetic disk or a persistent storage device that is connected to data processing system 900.

Alternatively, program code 918 may be transferred to data processing system 900 using computer readable signal media 926. Computer readable signal media 926 may be, for example, a propagated data signal containing program code 918. This data signal may be an electromagnetic signal, an optical signal, and/or some other type of signal that can be transmitted over physical and/or wireless communications links.

The illustration of data processing system 900 in FIG. 9 is not meant to provide architectural limitations to the manner in which the illustrative examples may be implemented. The different illustrative examples may be implemented in a data processing system that includes components in addition to or in place of those illustrated for data processing system 900. Further, components shown in FIG. 9 may be varied from the illustrative examples shown.

Figure 10:
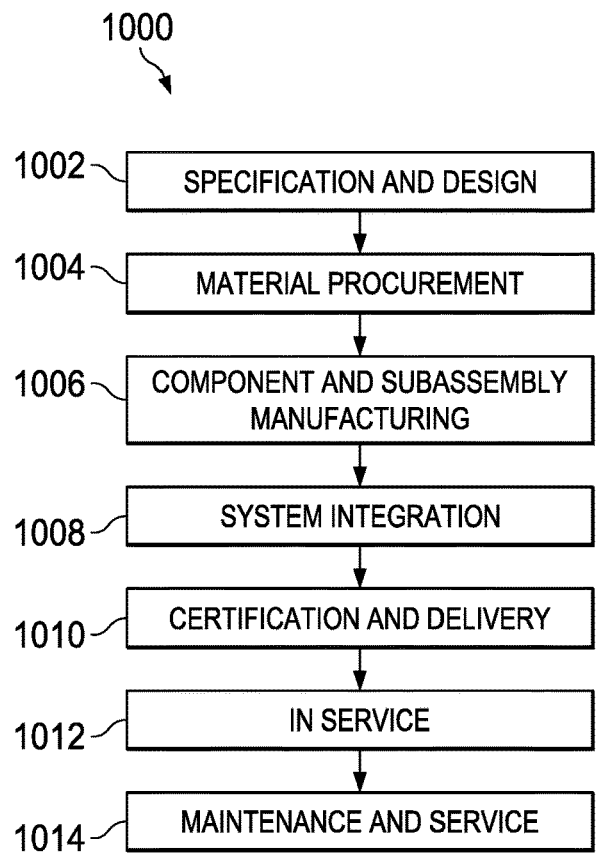
FIG. 10 is an illustration of an aircraft manufacturing and service method in the form of a block diagram in accordance with an illustrative example.
Figure 11:
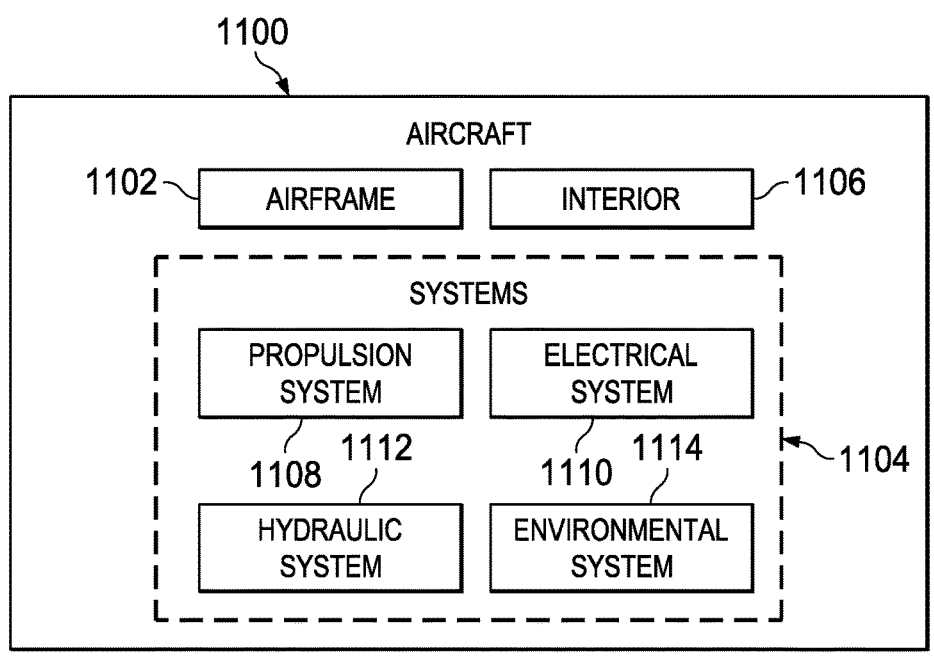
FIG. 11 is an illustration of an aircraft in the form of a block diagram in accordance with an illustrative example.

Illustrative examples of the disclosure may be described in the context of aircraft manufacturing and service method 1000 as shown in FIG. 10 and aircraft 1100 as shown in FIG. 11. Turning first to FIG. 10, an illustration of an aircraft manufacturing and service method is depicted in the form of a block diagram in accordance with an illustrative example. During pre-production, aircraft manufacturing and service method 1000 may include specification and design 1002 of aircraft 1100 in FIG. 11 and material procurement 1004.

During production, component and subassembly manufacturing 1006 and system integration 1008 of aircraft 1100 in FIG. 11 takes place. Thereafter, aircraft 1100 in FIG. 11 may go through certification and delivery 1010 in order to be placed in service 1012. While in service 1012 by a customer, aircraft 1100 in FIG. 11 is scheduled for routine maintenance and service 1014, which may include modification, reconfiguration, refurbishment, and other maintenance or service.

Each of the processes of aircraft manufacturing and service method 1000 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 11, an illustration of an aircraft is depicted in which an illustrative example may be implemented. In this example, aircraft 1100 is produced by aircraft manufacturing and service method 1000 in FIG. 10 and may include airframe 1102 with systems 1104 and interior 1106. Examples of systems 1104 include one or more of propulsion system 1108, electrical system 1110, hydraulic system 1112, and environmental system 1114. Any number of other systems may be included. Although an aerospace example is shown, different illustrative examples may be applied to other industries, such as the automotive industry.

Apparatuses and methods embodied herein may be employed during at least one of the stages of aircraft manufacturing and service method 1000 in FIG. 10. In particular, light management system 500 from FIG. 5 may be installed in or integrated as part of aircraft 1100 during any one of the stages of aircraft manufacturing and service method 1000. For example, without limitation, light management system 500 from FIG. 5 may be installed in or integrated as part of aircraft 1100 during at least one of component and subassembly manufacturing 1006, system integration 1008, routine maintenance and service 1014, or some other stage of aircraft manufacturing and service method 1000.

In some cases, lighting system 504 from FIG. 5 may already be an existing system on aircraft 1100. Control system 506 may then be retrofitted to aircraft 1100 to work with lighting system 504, thereby forming light management system 500 in FIG. 5. Light management system 500 in FIG. 5 may be used to control the generation of light scenes during flight when aircraft 1100 is in service 1012.

In one illustrative example, components or subassemblies produced in component and subassembly manufacturing 1006 in FIG. 10 may be fabricated or manufactured in a manner similar to components or subassemblies produced while aircraft 1100 is in service 1012 in FIG. 10. As yet another example, one or more apparatus examples, method examples, or a combination thereof may be utilized during production stages, such as component and subassembly manufacturing 1006 and system integration 1008 in FIG. 10. One or more apparatus examples, method examples, or a combination thereof may be utilized while aircraft 1100 is in service 1012 and/or during maintenance and service 1014 in FIG. 10. The use of a number of the different illustrative examples may substantially expedite the assembly of and/or reduce the cost of aircraft 1100.

The description of the different illustrative examples has been presented for purposes of illustration and description, and is not intended to be exhaustive or limited to the examples in the form disclosed. Many modifications and variations will be apparent to those of ordinary skill in the art. Further, different illustrative examples may provide different features as compared to other desirable examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. An apparatus comprising:
a lighting system positioned within an interior of an aircraft and comprised of a set of light devices capable of emitting light of different wavelengths; and
a control system that controls operation of the lighting system to create different light scenes during different periods of flight of the aircraft, wherein the control system selects a schedule for a first light scene, a second light scene, a third light scene, and a fourth light scene, wherein the different light scenes comprise:
the first light scene having a first spectral distribution that includes a first light having a first wavelength of about 590 nanometers, wherein the first light scene is emitted during a cruise phase of flight;
the second light scene having a second spectral distribution that includes a second light having a second wavelength between about 436 nanometers and about 486 nanometers, wherein the second light scene is emitted during a cruise phase of flight or a sleeping period of flight;
the third light scene having a third spectral distribution that includes a third light having a third wavelength between about 606 nanometers and about 656 nanometers, wherein the third light scene is emitted for a time interval during a landing phase of flight, a disembarkation period of flight, a taxiing phase of flight, an emergency period of flight, or a wakeup period of flight; and
the fourth light scene having a fourth spectral distribution that includes a fourth light having a fourth wavelength between about 530 nanometers and about 580 nanometers, wherein the fourth light scene is emitted for a time interval during a boarding period of flight, a taxiing phase of flight, or a takeoff period of flight.

2. An apparatus comprising:
a lighting system positioned within an interior of an aircraft and comprised of a set of light devices capable of emitting light of different wavelengths; and
a control system that controls operation of the lighting system to create different light scenes during different periods of flight of the aircraft, wherein the control system controls the lighting system to emit:
a first light scene having a first spectral distribution that includes a first light having a first wavelength of about 590 nanometers during a cruise phase of the flight; and
a second light scene having a second spectral distribution that includes a second light having a second wavelength other than 590 nanometers.

3. The apparatus of claim 2, wherein the second light scene has a second spectral distribution that includes the second light having the second wavelength between about 436 nanometers and about 486 nanometers.

4. The apparatus of claim 3, wherein the second light is blue light and the second wavelength is about 461 nanometers.

5. The apparatus of claim 3, wherein the different light scenes comprise a third light scene having a third spectral distribution that includes a third light having a third wavelength between about 606 nanometers and about 656 nanometers.

6. The apparatus of claim 3, wherein the different light scenes comprise a third light scene having a third spectral distribution that includes a third light having a third wavelength between about 530 nanometers and about 580 nanometers.

7. The apparatus of claim 2, wherein the second light scene has a second spectral distribution that includes the second light having the second wavelength between about 606 nanometers and about 656 nanometers.

8. The apparatus of claim 7, wherein the second light is red light and the second wavelength is about 631 nanometers.

9. The apparatus of claim 7, wherein the different light scenes comprise a third light scene having a third spectral distribution that includes a third light having a third wavelength between about 530 nanometers and about 580 nanometers.

10. The apparatus of claim 2, wherein the second light scene has a second spectral distribution that includes the second light having the second wavelength between about 530 nanometers and about 580 nanometers.

11. The apparatus of claim 10, wherein the second light is green light and the second wavelength is about 555 nanometers.

12. The apparatus of claim 2, wherein the control system selects a schedule for the first light scene and the second light scene.

13. A method for emitting different types of light during different periods of flight of an aircraft, comprising:
controlling a lighting system positioned within an interior of the aircraft and comprised of a set of light devices capable of emitting light of different wavelengths to create different light scenes during the different periods of flight, comprising controlling the lighting system to emit:
a first light scene having a first spectral distribution that includes a first light having a first wavelength of about 590 nanometers during a cruise phase of flight; and
a second light scene having a second spectral distribution that includes a second light having a second wavelength other than 590 nanometers.

14. The method of claim 13, wherein the second light scene has a second spectral distribution that includes the second light having the second wavelength between about 436 nanometers and about 486 nanometers.

15. The method of claim 13, wherein the second light scene has a second spectral distribution that includes the second light having the second wavelength between about 606 nanometers and about 656 nanometers.

16. The method of claim 13, wherein the second light scene has a second spectral distribution that includes the second light having the second wavelength between about 530 nanometers and about 580 nanometers.

17. The method of claim 14 further comprising controlling the lighting system to emit:

a third light scene having a third spectral distribution that includes a third light having a third wavelength between about 606 nanometers and about 656 nanometers; and a fourth light scene having a fourth spectral distribution that includes a fourth light having a fourth wavelength between about 530 nanometers and about 580 nanometers.

18. The method of claim 17 further comprising controlling the lighting system to emit:

the second light scene during a cruise phase of flight or a sleeping period of flight;

the third light scene during a landing phase of flight, a disembarkation period of flight, a taxiing phase of flight, an emergency period of flight, or a wakeup period of flight; and the fourth light scene for a time interval during a boarding period of flight, a taxiing phase of flight, or a takeoff period of flight.

19. The method of claim 14, wherein the second light is blue light and the second wavelength is about 461 nanometers.

20. The method of claim 17, wherein:

the third light is red light and the third wavelength is about 631 nanometers; and the fourth light is green light and the fourth wavelength is about 555 nanometers.

* * * * *